United States Patent
Tsai

(10) Patent No.: US 6,199,764 B1
(45) Date of Patent: Mar. 13, 2001

(54) UART WITH AN IC CARD READING INTERFACE AND IC CARD READING SYSTEM USING THE SAME

(75) Inventor: Hsi-Jung Tsai, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/250,635

(22) Filed: Feb. 16, 1999

(30) Foreign Application Priority Data

Dec. 9, 1998 (TW) ................................................ 87120426

(51) Int. Cl.[7] .............................. G06K 19/06; G06K 7/00
(52) U.S. Cl. ............................................. 235/492; 235/486
(58) Field of Search ................................... 235/441, 486, 235/487, 492, 375, 449

(56) References Cited

U.S. PATENT DOCUMENTS

| | | | |
|---|---|---|---|
| 4,065,662 | * 12/1977 | Garczynski et al. | 235/419 |
| 4,650,978 | * 3/1987 | Hudson et al. | 235/494 |
| 4,774,500 | * 9/1988 | Lichty | 341/95 |
| 5,729,004 | * 3/1998 | Kim et al. | 235/492 |
| 5,825,882 | * 10/1998 | Kowalski et al. | 380/25 |

* cited by examiner

Primary Examiner—Thien M. Le
(74) Attorney, Agent, or Firm—J.C. Patents; Jiawei Huang

(57) ABSTRACT

A UART having an IC card reading interface comprises a universal asynchronous communication core, a multiplexer and a 3-state control I/O buffer. The universal asynchronous communication core is responsible for an asynchronous serial communication. The multiplexer and the 3-state control I/O buffer enable serial output signal and serial input signal pins have different functions during an IC card reading mode and a universal asynchronous receive/transmit mode. An IC card reading system includes an IC card reader having an IC card socket and a smart card interface and a computer system having the UART with the IC card reading interface. Since the UART with an IC card reading interface can be directly electrically connected to the smart card interface of the IC card reader, a micro-controller and a receiver-transmitter can be saved in the IC card reader.

5 Claims, 4 Drawing Sheets

UART WITH AN IC CARD READING INTERFACE AND IC CARD READING SYSTEM USING THE SAME

CROSS-REFERENCE TO RELATED APPLICATION

This application claims the priority benefit of Taiwan application serial no. 87120426, filed Dec. 9, 1998, the full disclosure of which is incorporated herein by reference.

BACKGROUND OF THE INVENTION

1. Field of the Invention

The invention relates to a UART (Universal Asynchronous Receiver-Transmitter) and a smart IC card reading system, and in particular to a UART with an IC card reading interface and an IC card reading system using the same.

2. Description of the Related Art

Plastic money, such as bank cards including credit cards, has been more popular in these years. As we know, a conventional plastic card which is called a magnetic card with a magnetic strip stuck thereon cannot store a great amount of data and lack of security. In line with the great progress in semiconductor technology, the sizes of integrated circuits (ICs) are getting increasingly small. For this reason, an IC card has been developed by the integration of a plastic card and an IC, and is used to completely replace the conventional magnetic card. Since an IC card can store much more data, has a better security and cannot be easily damaged, the IC card not only functions as a bank card, but also as an identification card and a health insurance card. Therefore, it has become a new trend that the smart IC card is widely applied in our daily life.

In general, an IC card can be classified into a memory card, a microprocessor card and a contactless card. Currently, a card reader required for reading the memory card and the microprocessor card is designed mainly using an 8-bit micro-controller as a center to communicate with a computer's UART through an RS-232C communication interface. As shown in FIG. 1, a conventional IC card reading system is shown. In FIG. 1, an IC card reader 12 reads data from an IC card according to an ISO7816 specification. After that, the read data are transmitted to a personal computer 10 according to an RS-232C communication specification, and then are processed with a driver thereof.

The prior IC card reader 12 includes an IC card socket 19, a smart card interface 18, a micro-controller 17 and a receiver-transmitter 16. When an IC card is inserted into the IC card socket 19, a firmware included in the micro-controller 17 can control the smart card interface 18 to provide an I/O signal in compliance with an ISO7816 specification for access of the IC card according to commands from the personal computer 10. Typically, data read from the IC card through the micro-controller 17 are converted into an RS-232C specification signal by the receiver-transmitter 16, and then the RS-232C specification signal is transmitted to a UART 14 of the personal computer 10 through a receiver-transmitter 15 of the personal computer 10.

The IC card reader 12 requires more than 3 ICs, such as a micro-controller with a firmware therein, a receiver-transmitter for conversion to meet a communication interface specification and a smart card interface for conversion to meet an IC card specification. It can be known by referring to an ISO 7816 specification that an access serial data format for an IC card includes one start bit, 8 data bits, one parity bit and at least one guardtime bit, and is one of data formats which can be received and processed by the UART 14, i.e., one start bit, 8 data bits, one parity bit and one stop bit. As be obvious from the above, data are subjected to two specification conversions with similar serial data formats in the IC card reader 12 of the personal computer and the UART 14, respectively. This causes more energy source and materials consumption and higher manufacturing costs.

SUMMARY OF THE INVENTION

In view of the above, an object of the invention is to provide a UART with an IC card reading interface and an IC card reading system using the same. Since the inventive UART can be allowed to directly control a smart interface card, manufacturing costs for the entire IC card reading system and energy source and materials consumption are greatly reduced. As a result, the application of the UART becomes more flexible.

To achieve the above-stated object, a UART with an IC card reading interface according to the invention at least has a serial output signal and a serial input signal. The UART with an IC card reading interface includes a universal asynchronous communication core, a multiplexer and a 3-state control I/O buffer. The universal asynchronous communication core is responsible for communications of asynchronous serial signals which include an internal serial output signal, an internal serial input signal and a transmission clock output signal.

Furthermore, the multiplexer has an output terminal connected to a serial output signal, one input terminal connected to the transmission clock output signal, the other input terminal connected to the internal serial output signal, and a selecting terminal connected to a mode selecting signal. When the mode selecting signal indicates an IC card reading mode, the transmission clock output signal activates the serial output signal. When the mode selecting signal indicates a universal asynchronous receiver/transmit mode, the internal serial output signal activates the serial output signal. The 3-state control I/O buffer is connected to the internal serial output signal, the internal serial input signal, the mode selecting signal and a serial input signal, wherein the serial input signal is used to activate the internal serial input signal. If the mode selecting signal indicates an IC card reading mode, when the internal serial output signal is at a low potential, the serial input signal is at a low potential. Under the IC card reading mode, when the internal serial output signal is at a high potential, and the serial input signal is activated by an external signal, the serial input signal is equal to the external signal. Furthermore, when the internal serial output signal is at a high potential, and the serial input signal is not activated by the external signal, the serial input signal is at a high potential.

Additionally, an IC card reading system using the inventive UART with an IC card reading interface according to the invention includes an IC card reader with an IC card socket and a smart card interface, and a computer system with an UART which has an IC card reading interface therein. The IC card socket is provided for the connection to an IC card. The smart card interface electrically connected to the IC card socket supplies an I/O signal required for access to the IC card. The UART with an IC card reading interface is electrically coupled to the smart card interface for controlling the smart card interface to access an inserted IC card. Furthermore, the UART can be optionally connected to a receiver-transmitter for providing an asynchronous communication function to the computer system.

Due to the use of the inventive UART with an IC card reading interface, the computer system can be directly connected to the smart card interface inside the IC card reader with a saving of a micro-controller and a receiver-transmitter. Therefore, manufacturing costs and energy source and materials consumption are greatly decreased. Furthermore, the computer system can also be selectively connected to the receiver-transmitter, thereby providing an asynchronous communication function to the computer system, resulting in a flexible application.

In addition, another UART with an IC card reading interface according to the invention includes a universal asynchronous communication core, a multiplexer, an inverter, an inverting AND gate, a 3-state inverter and a pull-up resistor. The universal asynchronous communication core is responsible for communications of asynchronous serial signals including an internal serial input signal, an internal serial input signal and a transmission clock output signal. The multiplexer has one input terminal connected to the transmission clock output signal, the other input terminal connected to the internal serial output signal and a selecting terminal connected to a mode selecting signal. When the mode selecting signal is at a high potential, the transmission clock output signal activates the output of the multiplexer. When the mode selecting signal is at a low potential, the internal serial output signal activates the output of the multiplexer. The inverter has an input terminal connected to the internal serial output signal. The inverting AND gate has one input terminal connected to the output of the inverter and the other input terminal connected to the mode selecting signal. The 3-state inverter has an input terminal connected to the output of the inverter and a control terminal connected to the output of the inverting AND gate, wherein the internal serial input signal is output from the 3-state inverter. As to the pull-up resistor, it has one terminal connected to the output of the 3-state inverter and the other terminal connected to a power supply voltage.

The UART with an IC card reading interface further includes a buffer having an output terminal connected to the internal serial input signal and an input terminal connected to the output of the 3-state inverter. The universal asynchronous communication core may include a modem control register which provides a mode selecting signal.

BRIEF DESCRIPTION OF THE DRAWINGS

The invention will be more fully understood from the detailed description given hereinbelow and the accompanying drawings which are given by way of illustration only, and thus do not limit the present invention, wherein.

DETAILED DESCRIPTION OF THE PREFERRED EMBODIMENTS

Figure 1:
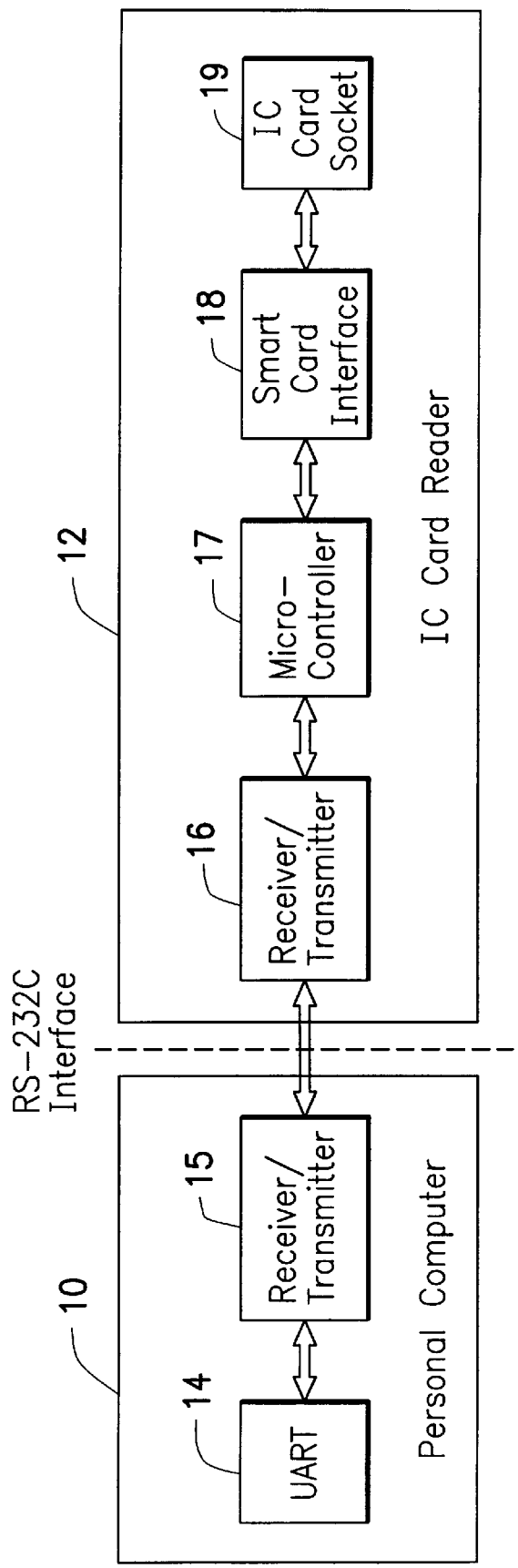
FIG. 1 is a block circuit diagram showing an IC card reading system according to the prior art.
Figure 2:
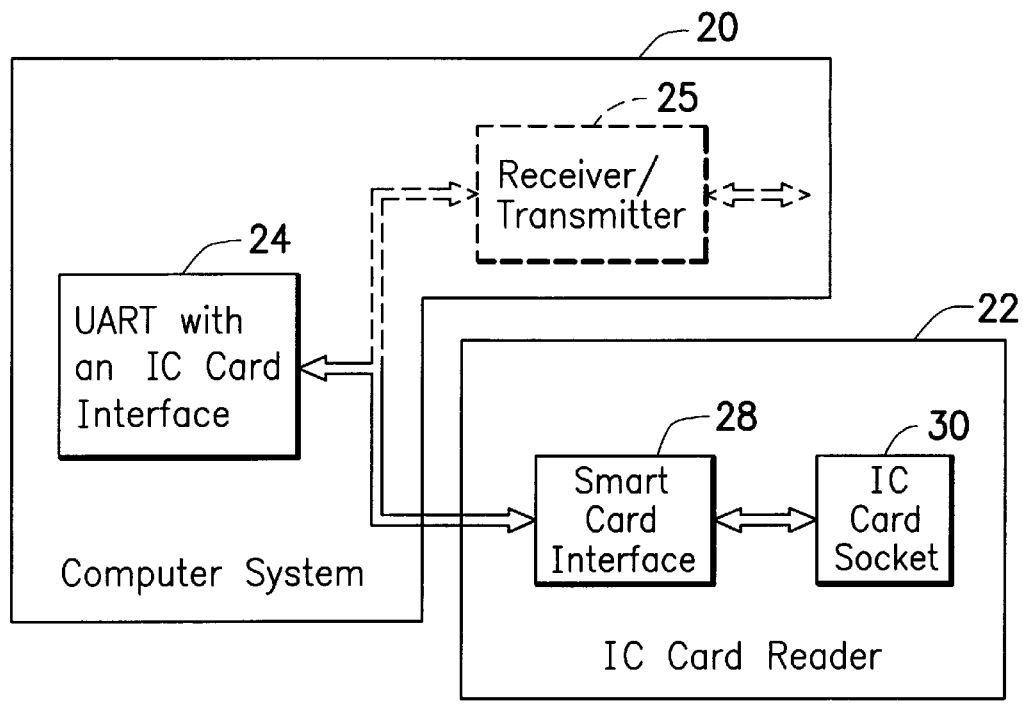
FIG. 2 is a block circuit diagram showing an IC card reading system according to a preferred embodiment of the invention.

FIG. 2 is a block circuit diagram showing an IC card reading system according to a preferred embodiment of the invention. The inventive IC card reading system of FIG. 2 includes an IC card reader 22 having an IC card socket 30 and a smart card interface 28 and a computer system 20 having a UART 24. The UART 24 is designed to be integrated into one IC together with an IC card reading interface (not shown). The computer system 20 where the UART 24 with an IC card reading interface is located can be directly connected to the smart card interface 28 in the IC card reader 22. As compared to the prior IC card reader, manufacturing costs and energy source and materials consumption are greatly reduced because two ICs, a micro-controller and a receiver-transmitter, are saved in the IC card reader 22.

The IC card socket 30 is designed in compliance with ISO specification, and can be electrically connected to an IC card. The smart card interface 28 is used to detect whether or not an IC card is inserted/removed into/from the IC card socket 30, and to provide required reset/clock signals and a power supply to an inserted IC card. That is, I/O signals required for access to the inserted IC card are provided by the smart card interface 28.

Furthermore, the UART 24 with an IC card reading interface in the computer system 20 is directly connected to the smart card interface 28 so as to control the smart card interface 28 to write data to an inserted IC card or read data from the inserted IC card. In addition, the UART 24 still reserves all functions a general UART possesses, and therefore can be selectively connected to a receiver-transmitter 25 by using a multiplexer, such as a jumper, to provide the computer system 20 an asynchronous communication function, such as RS-232C. As can be known from the above, the applications of the inventive UART become more flexible.

Unlike the prior IC card reading system which has a firmware located in a micro-controller of an IC card reader for controlling an inserted IC card, the inventive IC card reading system without use of a micro-controller employs a device driver or BIOS to drive the UART 24 in order to directly control the smart card interface 28 for access to an inserted IC card.

Figure 3:
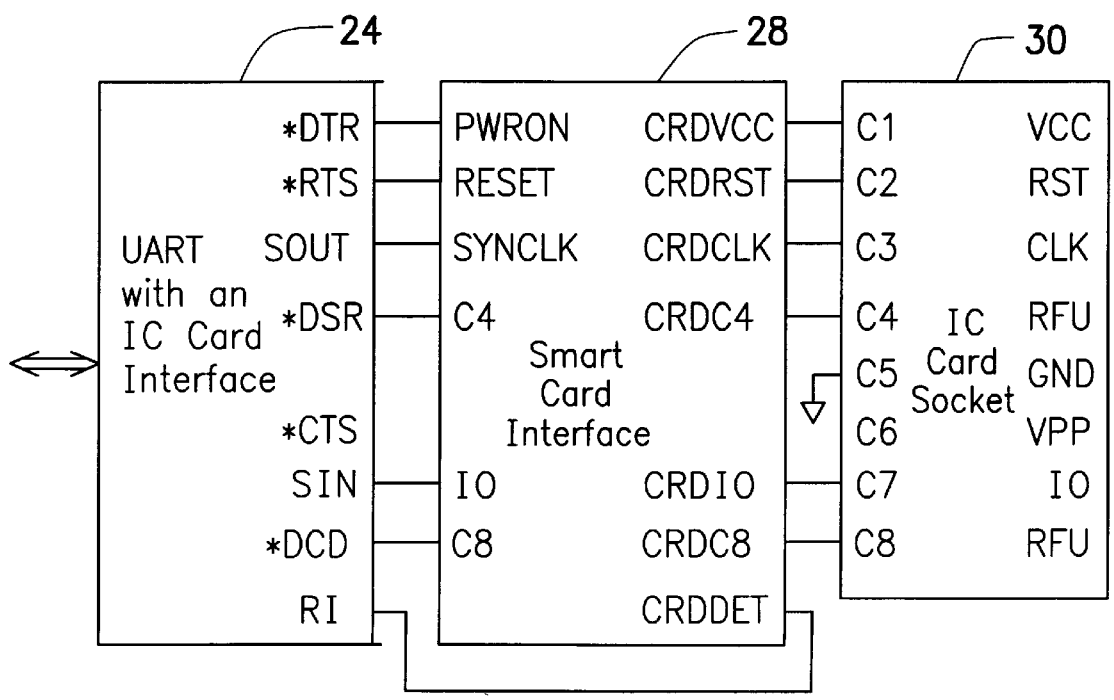
FIG. 3 is a schematic view showing the connection of the IC card reading system of FIG. 2 according to a preferred embodiment of the invention.

FIG. 3 is a schematic view showing the connection of the IC card reading system of FIG. 2 according to a preferred embodiment of the invention. Referring to FIG. 3, since the UART 24 with an IC card reading interface still reserves a general asynchronous communication function, and can be electrically connected to the IC card reader 22, the pine definitions thereof depend on which one of the smart card interface 28 and the receiver-transmitter 25 is connected to the UART 24. In the embodiment, the different pin definitions for applications in a general UART and an IC card reading interface are shown in Table 1.

TABLE 1

| General UART | IC Card Reading Interface |
| --- | --- |
| *DTR(Data Terminal ready) | PWRON(Power On) |
| *RTS(Request Transmission) | Reset |
| *DSR(Data Setting Ready) | C4(Reserved) |
| *CTS(Clean Transmission) | N.A. |
| *CD(Carrier Detection) | C8(Reserved) |
| RI(Receive Indication) | CRDDET(Card Detection) |
| SOUT(Serial Output) | STNCLK(Synchronous Clock) |
| SIN(Serial Input) | IO(Data Input/Output) |

It is noted that a pin is defined as a serial data output pin in a general UART while as a synchronous clock output pin in an IC card reading interface. A pin is defined as a serial data input pin in the general UART while as a data input/output pin in the IC card reading interface. In the embodiment, a 9-pin connector generally for an RS-232C communication interface can also be used. As can be known by those skilled in the art, the pins defined in Table 1 can be classified into different groups according to their input/output. The pin definitions in the same group are exchangeable only in coordination with a driver.

Figure 4:
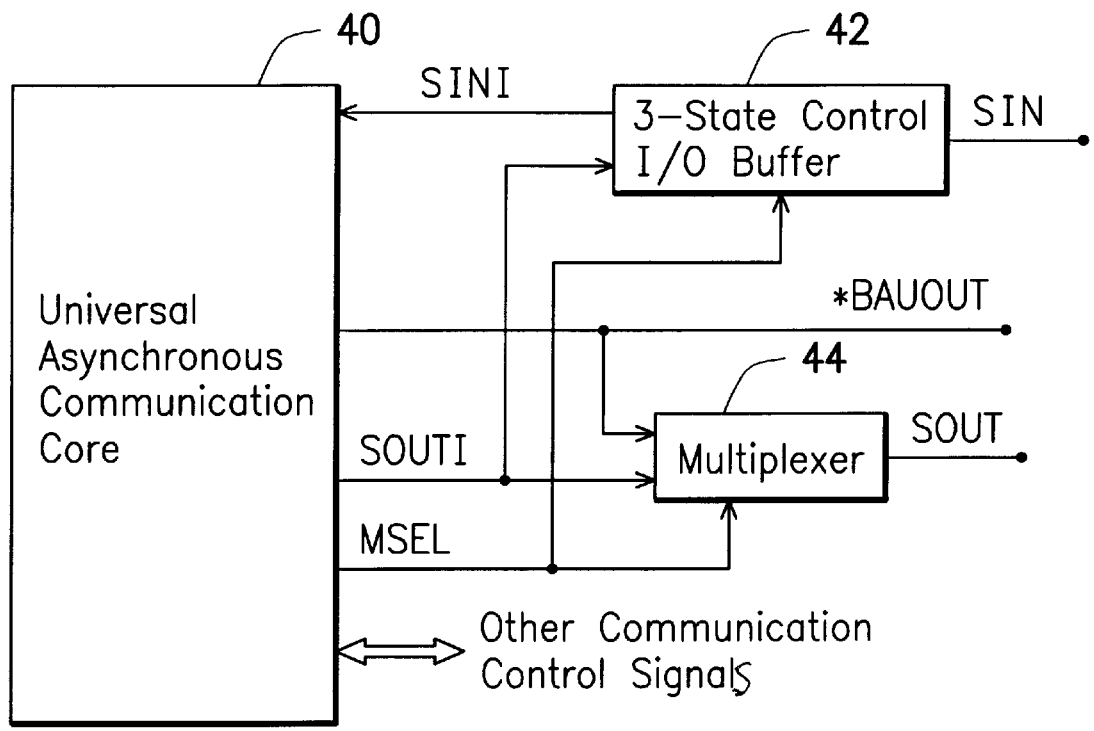
FIG. 4 is a block circuit diagram showing a UART with an IC card reader according to a preferred embodiment of the invention.

FIG. 4 is a block circuit diagram showing a UART having an IC card reader according to a preferred embodiment of the invention. Referring to FIG. 4, a UART with an IC card reading interface can be applied in the IC card reading system of FIG. 3. Most input/output signals are setting and detecting input/output signals except for a serial output signal SOUT and a serial input signal SIN. As can be known by those skilled in the art, a driver can be used for proper driving and detecting according to different definitions in different applications, and will not be further described hereinafter. How the above-stated two kinds of signal pins are responsible for different functions in different application modes is described in the following.

The UART with an IC card reading interface includes an universal asynchronous communication core 40, a multiplexer 44 and a 3-state control I/O buffer 42. The universal asynchronous communication core 40 is responsible for an asynchronous communication function a general UART originally possesses, and has signals all required for an asynchronous serial communication, including an internal serial output signal SOUT1, an internal serial input signal SINI and a transmission clock output signal *BAUOUT. Moreover, the universal asynchronous communication core 40 provides a mode selecting signal MSEL to set the inventive UART having an IC card reading interface as a universal asynchronous receive/transmit mode or an IC card reading mode.

The multiplexer 44 has an output terminal for transmitting the serial output signal SOUT, one input terminal for receiving the transmission clock output signal *BAUOUT, the other input terminal for receiving the internal serial output signal SOUTI and a selecting terminal for receiving the mode selecting signal MSEL. When the mode selecting signal MSEL indicates an IC card reading mode, the multiplexer 44 selects the transmission clock output signal *BAUOUT as the serial output signal SOUT. When the mode selecting signal MSEL indicates a universal asynchronous receive/transmit mode, the multiplexer 44 selects the internal serial output signal SOUTI as the serial output signal SOUT. In other words, which one of the transmission clock output signal *BAUOUT and the internal serial output signal SOUTI is selected as the output of the multiplexer 44 depends on the two different application modes.

Furthermore, the 3-state control I/O buffer 42 is connected to the internal serial output signal SOUTI, the internal serial input signal SINI, the mode selecting signal MSEL and the serial input signal SIN. When the mode selecting signal MSEL indicates a universal asynchronous receive/transmit mode, the serial input signal SIN pin simply serves as a serial data input. Inversely, when the mode selecting signal MSEL indicates an IC card reading mode, the serial input signal SIN pin serves as an I/O signal pin which for concurrently transmitting/receiving serial data. No matter which mode is, the internal serial input signal SINI is always generated by driving with the serial input signal SIN.

Moreover, at an IC card reading mode in which the serial input signal SIN pin functions an I/O signal pin, when the internal serial output signal SOUT1 is at a low potential, the serial input signal SIN is changed into a low potential to activate an external signal which is connected thereto. When the internal serial output signal SOUTI is at a high potential, and the serial input signal is activated by the external signal, the serial input signal SIN is equal to the external signal. When the internal serial output signal SOUTI is at a high potential, and the serial input signal is not activated by the external signal, the serial input signal SIN is at a high potential.

Figure 5:
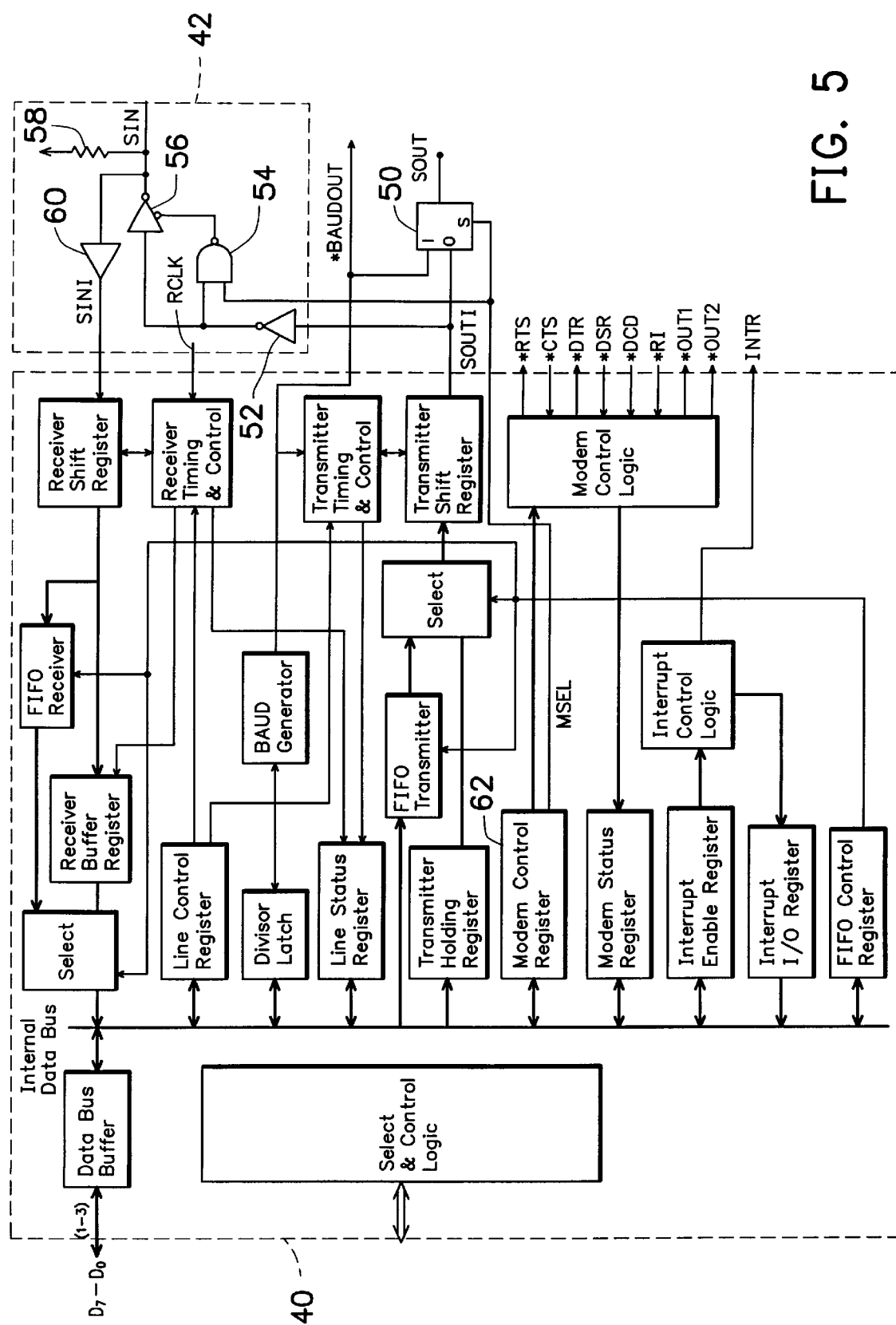
FIG. 5 is a block circuit diagram showing a detailed UART having an IC card reader according to a preferred embodiment of the invention.

FIG. 5 is a detailed block circuit diagram showing a UART with an IC card reader according to a preferred embodiment of the invention. The UART with an IC card reading interface includes an universal asynchronous communication core 40, a multiplexer 50, an inverter 52, an inverting AND gate 54, a 3-state inverter 56 and a pull-up resistor 58. The universal asynchronous communication core 40 is responsible for an asynchronous serial communication function that a general UART possesses, and has signals all required for an asynchronous serial communication. A mode selecting signal MSEL is set and provided by using remaining bits stored in a modem control register 62 of the universal asynchronous communication core 40.

The multiplexer 50 has an input terminal connected to a transmission clock output signal *BAUDOUT, the other input terminal connected to an internal serial output serial SOUTI, a selecting terminal connected to a mode selecting signal MSEL and an output terminal connected to a serial output signal SOUT. When the mode selecting signal MSEL is at a high potential, indicating an IC card reading mode, the transmission clock output signal *BAUDOUT is selected to serve as the serial output signal SOUT. When the mode selecting signal MSEL is at a low potential, indicating a universal asynchronous receive/transmit mode, the internal serial output signal SOUTI is selected to serve as the serial output signal SOUT. The inverter 52 has an input terminal connected to the internal serial output signal SOUTI. The inverting AND gate 54 has one input terminal connected to the output terminal of the inverter 52 and the other input terminal connected to the mode selecting signal MSEL. That is, when the mode selecting signal MSEL is at a high potential, indicating an IC card reading mode, and the internal serial output signal SOUTI is at a low potential, the output of the inverting AND gate 54 is a low potential.

The 3-state inverter 56 has an input terminal connected to the output terminal of the inverter 52, a control terminal connected to the output terminal of the inverting AND gate 54 and an output terminal connected to the serial input signal SIN. Moreover, a buffer 60 is used to make the internal serial input signal SINI equal to the serial input signal SIN. As known by those skilled in the art, the buffer 60 is optional. As to the pull-up resistor 58, it has one terminal connected to the output terminal of the 3-state inverter 56 and the other terminal connected to a power supply voltage (not shown). In other words, under an IC card reading mode, when the internal serial output signal SOUTI is at a low potential, the output of the 3-state inverter 56, i.e., the serial input signal SIN, is changed into a low potential to activate a connected external signal. When the internal serial output signal SOUTI is at a high potential, the output of the 3-state inverter 56 is at a high-impedance. At this time, if the serial input signal is not activated by the external signal, the serial input signal SIN is pull up to a high potential by the pull-up resistor 58. On the contrary, when the internal serial output signal SOUTI is at a high potential, and the serial input signal is activated by the external signal, the serial input signal is equally activated by the external signal because the high output impedance of the 3-state inverter 56.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A UART having an IC card reader at least with a serial output signal and a serial input signal, comprising:

a universal asynchronous communication core responsible for an asynchronous serial communication at least with an internal serial output signal, an internal serial input signal and a transmission clock output signal;

a multiplexer of which one input terminal is connected to the transmission clock output signal, the other input terminal is connected to the internal serial output signal, a selecting input terminal is connected to a mode selecting signal and an output terminal is connected to the serial output signal, wherein the transmission clock output signal is selected to serve as the serial output signal when the mode selecting signal indicates an IC card reading mode, and the internal serial output signal is selected to serve as the serial output signal when the mode selecting signal indicates a universal asynchronous receive-transmit mode; and a 3-state control I/O buffer connected to the internal serial output signal, the internal serial input signal, the mode selecting signal and the serial input signal, wherein the internal serial input signal is generated by driving with the serial input signal and at an IC card reading mode indicated by the mode selecting signal, the serial input signal is at a low potential when the internal serial output signal is at a low potential, the serial input signal is equal to an external signal when the internal serial output signal is at a high potential and the serial input signal is activated by the external signal, and the serial input signal is at a high potential when the internal serial output signal is at a high potential and the serial input signal is not activated by the external signal.

2. The UART having an IC card reader as claimed in claim 1, wherein the universal asynchronous communication core provides the mode selecting signal.

3. A UART having an IC card reader comprising:

a universal asynchronous communication core responsible for asynchronous serial communication at least with an internal serial output signal, an internal serial input signal and a transmission clock output signal;

a multiplexer of which one input terminal is connected to the transmission clock output signal, the other input terminal is connected to the internal serial output signal, a selecting input terminal is connected to a mode selecting signal, wherein the transmission clock output signal is selected to output from the multiplexer when the mode selecting signal indicates a high potential, and the internal serial output signal is selected to output from the multiplexer when the mode selecting signal indicates a low potential; and an inverter an input terminal of which is connected to the internal serial output signal;

an inverting AND gate of which one input terminal is connected to the output terminal of the inverter and the other input terminal is connected to the mode selecting signal;

a 3-state inverter of which an input terminal is connected to the output terminal of the inverter, a control terminal is electrically connected to the output terminal of the inverting AND gate and an output terminal is electrically connected to the internal serial input signal; and a pull-up resistor of which one terminal is electrically connected to the output terminal of the 3-state inverter and the other terminal is electrically connected to a power source.

4. The UART having an IC card reader as claimed in claim 3, further comprising a buffer of which an input terminal is electrically connected to the output terminal of the 3-state inverter and an output terminal is connected to the internal serial input signal.

5. The UART having an IC card reader as claimed in claim 3, wherein the universal asynchronous communication core comprises a modem control register which is used to provide the mode selecting signal.

* * * * *